J. H. SHERRILL.
Stump Puller.
No. 231,243.  Patented Aug. 17, 1880.
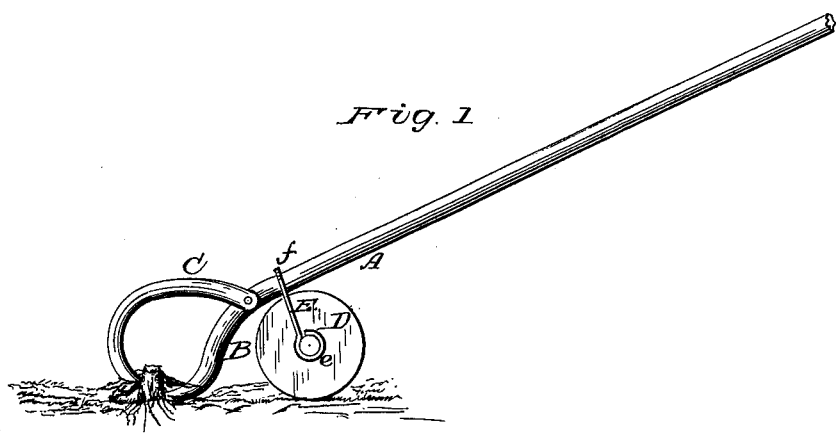
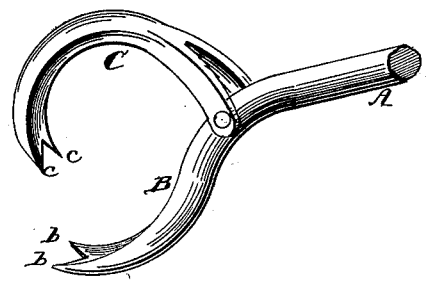
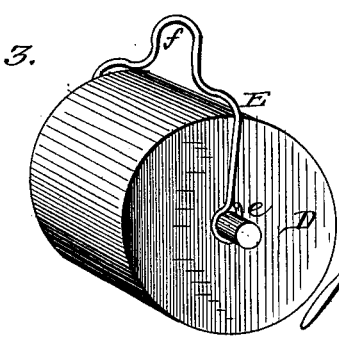
Witnesses:
Fred G. Dietrich
Charles King.
Inventor:
John H. Sherrill,
by A. Peterson & Co.
Attorneys

UNITED STATES PATENT OFFICE.

JOHN H. SHERRILL, OF JASPER, TENNESSEE.

STUMP-PULLER.

SPECIFICATION forming part of Letters Patent No. 231,243, dated August 17, 1880.

Application filed January 19, 1880.

*To all whom it may concern:*

Be it known that I, JOHN H. SHERRILL, of Jasper, in the county of Marion and State of Tennessee, have invented certain new and useful Improvements in Stump-Pullers; and I do hereby declare that the following is a full, clear, and exact description of the invention, which will enable others skilled in the art to which it appertains to make and use the same, reference being had to the accompanying drawings, which form a part of this specification, and in which—

Figure 1 is a side elevation of my improved stump-puller with its fulcrum-block in position ready for operation. Fig. 2 is a perspective view of the jaws of the pulling-lever, and Fig. 3 is a perspective view of the fulcrum-block detached.

Similar letters of reference indicate corresponding parts in all the figures.

This invention has relation to devices or implements for pulling grubs or stumps out of the ground; and it consists in the combination, with a lever having one rigid and one pivoted jaw, of an adjustable cylindrical fulcrum-block, the device being so arranged that the toothed ends of the jaws may be inserted sidewise in under the stump or grub to be removed, substantially as and for the purpose hereinafter more fully set forth.

In the drawings, A is the lever or handle, one end of which is bent in a downward direction to form the rigid jaw B, the point of which is bifurcated and filed to form two or more sharp teeth or prongs, *b b*.

At the point where lever A is bent to form the rigid jaw B is hinged the movable jaw C, the point of which is filed in like manner as B to form sharp teeth or prongs *c c*. The curved and hinged jaw C is longer than B and is of a hook shape, as shown in the drawings.

D is a wooden cylinder having a central perforation, into which an axle is inserted, the projecting ends of which are pivoted in eyes *e e* of a bail, E, which is bent at its upper end to form a stirrup, *f*, through which in operating the implement the lever A is inserted, as shown in Fig. 1 of the drawings, and which prevents this from slipping sidewise off of the fulcrum-block, and also serves as a convenient handle for carrying it.

In using this device the points of the jaws B C are inserted into the ground by removing a portion of the dirt around the grub, so as to project well in under the roots, as shown in Fig. 1 of the drawings, and take a firm hold by the teeth *b b c c* biting into the roots. The block D is then slid down under the bend of lever A, and the grub or stump is raised out of the ground by depressing the end of the lever.

Having thus described my invention, I claim and desire to secure by Letters Patent of the United States—

The combination of the grub or stump puller consisting of the hinged jaw C, rigid jaw B, and lever A, constructed as described, with the adjustable cylindrical fulcrum-block D, provided with the bail E and stirrup *f*, substantially as and for the purpose herein shown and set forth.

In testimony that I claim the foregoing as my own I have hereto affixed my signature in presence of two witnesses.

JOHN HENRY SHERRILL.

Witnesses:
   W. S. GRIFFITH,
   W. J. J. HOGE.